United States Patent [19]

Harasaki et al.

[11] 4,234,225
[45] Nov. 18, 1980

[54] REAR REINFORCEMENT STRUCTURE FOR AUTOMOBILE BODIES

[75] Inventors: Hayatsugu Harasaki; Isao Teramoto, both of Hiroshima, Japan

[73] Assignee: Toyo Kogyo Co., Ltd., Hiroshima, Japan

[21] Appl. No.: 62,799

[22] Filed: Aug. 1, 1979

[30] Foreign Application Priority Data

Aug. 3, 1978 [JP] Japan .................. 53-107122

[51] Int. Cl.³ .......................................... B62D 25/02
[52] U.S. Cl. ............................ 296/185; 296/188; 296/195; 296/198
[58] Field of Search ............. 296/185, 186, 187, 188, 296/189, 191, 195, 196–198

[56] References Cited

U.S. PATENT DOCUMENTS

| | | | |
|---|---|---|---|
| 2,841,439 | 7/1958 | Schwenk | 296/198 |
| 3,042,444 | 7/1962 | Porsche | 296/191 |
| 3,423,122 | 1/1969 | Wessells | 296/185 |
| 3,423,123 | 1/1969 | Wessells | 296/185 |
| 3,517,765 | 6/1970 | Wessells | 296/195 |
| 3,590,936 | 7/1971 | Wessells | 296/195 |
| 3,661,419 | 5/1972 | Mitamura | 296/195 |
| 3,697,124 | 10/1972 | Wessells | 296/185 |

*Primary Examiner*—Robert R. Song
*Attorney, Agent, or Firm*—Fleit & Jacobson

[57] ABSTRACT

A "hard-top" type automobile body having rear side panel structures formed at front edge portions with seats for rear edges of side doors. A rear pillar extends from each side panel structure to the roof. A longitudinal reinforcement member is provided in the side panel structure to extend from the door edge seat rearwardly to be connected with the rear pillar. The member further extends beyond the rear pillar and has a rear end connected with a transversely extending reinforcement so that the transverse rigidity of the rear side panel is increased at the area of the door edge seat without increasing the cross-section of the longitudinal reinforcement member.

7 Claims, 4 Drawing Figures

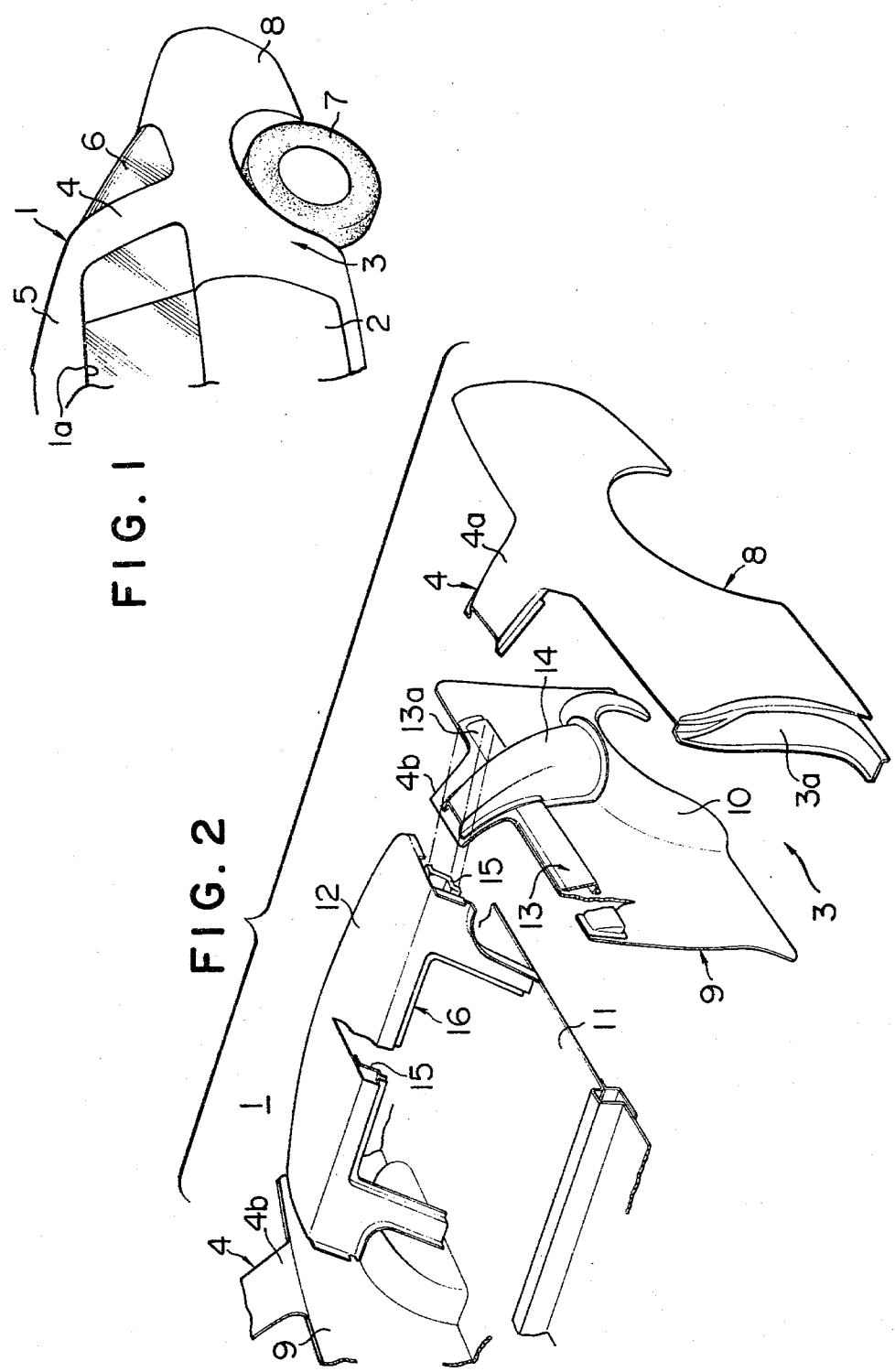

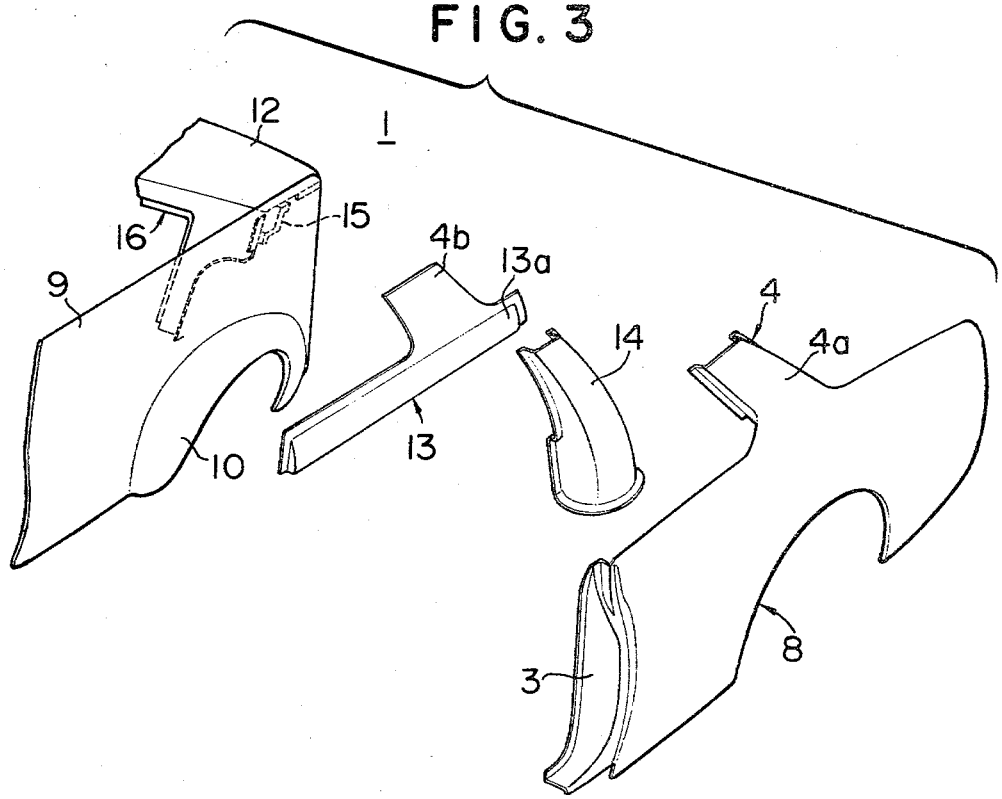
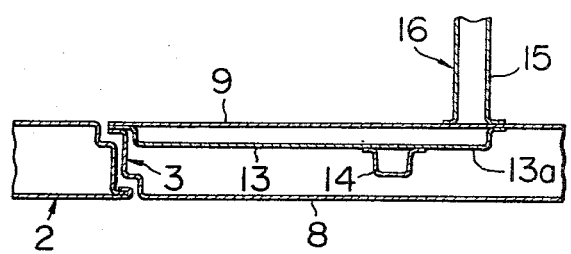

REAR REINFORCEMENT STRUCTURE FOR AUTOMOBILE BODIES

The present invention relates to automobile bodies and more particularly to so-called "hard-top" bodies for automobiles which have no center pillars. More specifically, the present invention pertains to reinforcement structures for rear part of such "hard-top" type automobile bodies.

In conventional automobile bodies having side doors hinged to the bodies at front edges thereof, the rear or free ends of such doors are usually received by center pillars in closed positions where such center pillars are provided. However, since "hard-top" type bodies have no center pillars, means must specifically provided in the rear body parts for receiving the rear edges of the doors. Such means are usually in the form of door edge seats formed at front edges of rear side panels forwardly apart from well reinforced rear pillars. It is therefore necessary to provide reinforcement structures so that sufficient strength and rigidity are retained in the door edge seat portions.

Hithertofore, in order for meeting such requirement, the rear body part has been provided at each side with a reinforcement member which is attached to the inner panel and extends from the door edge seat rearwardly to the rear pillar. In the conventional structure, however, the rear end portion of the reinforcement member is structurally supported only by the rear pillar so that the reinforcement member must be of a large cross-section in order to obtain an adequate rigidity.

It is therefore an object of the present invention to provide rear reinforcement structure for "hard-top" type automobile bodies which can provide an adequate rigidity without increasing the cross-section of the reinforcement member.

Another object of the present invention is to provide rear reinforcement structure for "hard-top" bodies in which rear end portions of the reinforcement member is structurally supported at two longitudinally spaced portions.

According to the present invention, the above and other objects can be accomplished by an automobile body comprising side door openings formed at the opposite sides thereof, rear side structures extending rearwardly from said door openings and having front ends formed with seating means for receiving rear edges of door panels which are mounted on the body, each of said rear side structures including rear side panel means, rear pillar means extending from the rear side panel means upwardly to roof means of the body, transverse reinforcement means extending between the rear side panel means of the opposite rear side structures rearwards of the rear pillar means, longitudinal reinforcement means attached to each rear side panel means and extending rearwardly from the seating means, said longitudinal reinforcement means extending rearwardly beyond said rear pillar means to the transverse reinforcement means and connected with both said rear pillar means and the transverse reinforcement means at longitudinally spaced portions. Since the longitudinal reinforcement means is connected at two spaced apart positions with the rear pillar means and the transverse reinforcement means, the transverse rigidity of the rear side structure can be significantly increased particularly at the seating means for receiving the door edges. The transverse reinforcement means may be a transverse reinforcement member which has conventionally been employed for rear shelf structures.

As usual, the rear side panel means may be comprised of an outer panel and an inner panel which are welded together at least partly along peripheries thereof and the transverse reinforcement means may be a reinforcement member of a curved cross-section which is welded along its periphery to the inner panel to define a reinforcement structure of closed cross-section. The rear pillar may include a reinforcement member of a curved or channel-shaped cross-section which is also welded to the inner panel and extends upwardly to cross-over the longitudinal reinforcement member.

The above and other objects and features of the present invention will become apparent from the following descriptions of a preferred embodiment taking reference to the accompanying drawings, in which;

FIG. 1 is a fragmentary perspective view of an automobile particularly showing the rear part thereof;

FIG. 2 is an exploded perspective view of the rear body structure of the automobile shown in FIG. 1;

FIG. 3 is a further exploded perspective view showing the details of the reinforcement members; and, FIG. 4 is a fragmentary horizontal sectional view of the rear side structure having a reinforcement in accordance with the present invention.

Referring now to the drawings, particularly to FIG. 1, there is shown an automobile with a so-called "hard-top" body 1 having no center pillar. The body 1 is formed with doors openings 1a at the opposite sides thereof and a door 2 is mounted to each door opening 1a at its front edge portion. The body 1 comprises rear side structures 3 extending rearwardly from the door openings 1a and rear pillars 4 extending upwardly from the rear side structures 3 to a roof structure 5. At the rear end of the body 1, there is provided a rear window and the body 1 is supported by front wheels (not shown) and rear wheels 7.

Referring now to FIG. 2, the rear side structure 3 is comprised of an outer panel 8 and an inner panel 9 which are assembled with a space therebetween. The outer panel 8 is formed at its front edge portion with a laterally inwardly stepped door edge seat 3a which is adapted to receive the rear edge portion of the door 2. The inner panel 9 is formed at the lower edge portion with a semi-circular recess 10 which defines a tire house. The inner panel 9 is welded along the front, upper and lower edges with the outer panel 8 to constitute a rear side panel.

The rear pillar 4 is comprised of an outer pillar panel 4a which is formed integrally with the outer panel 8 to extend upwardly from the upper edge of the panel 8, and an inner pillar panel 4b which is formed in this embodiment separately from the inner panel 9 and welded thereto. The rear pillar 4 further includes a vertical reinforcement member 14 which is of a channel-shaped cross-section and welded to the inner panel 9 to define a reinforcement structure of closed cross-section. As shown in FIG. 2, the vertical reinforcement member 14 extends from the recess 10 to the roof structure 5.

Referring to FIG. 3, it will be noted that the inner pillar panel 4b is formed integrally with a longitudinally extending reinforcement member 13 which is of a curved cross-section and welded to the inner panel 9 to define a reinforcement structure of a closed cross-section. It should of course be noted that the inner pillar panel may be formed integrally with the inner panel 9 and the longitudinal reinforcement member 13 may be separately formed and welded to the inner panel 9. Further, the inner pillar panel 4b and the longitudinal reinforcement member 13 may be respectively formed as separate parts and welded to the inner panel 9.

As shown in FIG. 2, the automobile body 1 is provided at the rear portion with a shelf 12 located above the level of floor 11 and having a transversely extending reinforcement structure 16 comprised of a transverse reinforcement member 15 which is welded to the shelf 12 to define a reinforcement structure of closed cross-section. The reinforcement member 15 is welded at its opposite ends to the inner panels 9 of the both rear side structures 3.

It will be noted in FIGS. 2 through 4 that the longitudinal reinforcement member 13 has a rearward extension 13a which extends rearwardly beyond the rear pillar 4 to the area where the transverse reinforcement member 15 is welded to the inner panel 9. Thus, the longitudinal reinforcement member 13 is structurally connected with the transverse reinforcement member 15 as well as with the vertical reinforcement member 14 in the rear pillar 4. The rear portion of the longitudinal reinforcement member 13 is therefore supported at two longitudinally spaced portions so that the lateral rigidity of the rear side structure can be significantly increased at the door edge seat portion 3a without increasing the cross-section of the longitudinal reinforcement member. In the illustrated embodiment of the present invention, the reinforcement member for the rear shelf is utilized to provide the additional or second support for the longitudinal reinforcement member. It is therefore unnecessary to provide an additional transverse reinforcement member for the specific purpose. The arrangement is further advantageous from the viewpoint of safety in that the rear passenger compartment is surrounded by rigid reinforcement structures of closed cross-sections.

The invention has thus been shown and described with reference to a specific embodiment, however, it should be noted that the invention is in no way limited to the details of the illustrated structures but changes and modifications may be made without departing from the appended claims.

We claim:

1. An automobile body comprising side door openings formed at the opposite sides thereof, rear side structures extending rearwardly from said door openings and having front ends formed with seating means for receiving rear edges of door panels which are mounted on the body, each of said rear side structures including rear side panel means, rear pillar means extending from the rear side panel means upwardly to roof means of the body, transverse reinforcement means extending between the rear side panel means of the opposite rear side structures rearwards of the rear pillar means, longitudinal reinforcement means attached to each rear side panel means and extending rearwardly from the seating means, said longitudinal reinforcement means extending rearwardly beyond said rear pillar means to the transverse reinforcement means and connected with both said rear pillar means and the transverse reinforcement means at longitudinally spaced portions.

2. An automobile body in accordance with claim 1 in which said transverse reinforcement means is a transverse reinforcement member provided for a rear shelf structure.

3. An automobile body in accordance with claim 1 in which said rear side panel means comprises an outer panel and an inner panel which are connected together with a space therebetween, said longitudinal reinforcement means being attached to the inner panel and positioned in said space.

4. An automobile body in accordance with claim 3 in which said rear pillar means includes a vertically extending reinforcement member having a curved cross-section and attached to the inner panel of the rear side panel means to provide a reinforcement structure of a closed cross-section, said vertical reinforcement member extending over the longitudinal reinforcement means and being connected thereto.

5. An automobile body in accordance with claim 4 in which said rear pillar means comprises inner and outer pillar panels which are welded together along edges thereof, said vertical reinforcement member being attached to said inner pillar panel.

6. An automobile body in accordance with claim 1 in which said rear side panel means comprises an outer panel and an inner panel which are connected together with a space therebetween, said rear pillar means comprising an inner pillar panel and an outer pillar panel which are connected together, said longitudinal reinforcement means being attached to the inner panel of the rear side panel means at a side facing to the space between the outer and inner panels of the rear side panel means, said rear pillar means including vertically extending reinforcement means which is attached to the inner panel of the rear side panel means and the inner pillar panel means to form a reinforcement structure of closed cross-section and extends between substantially lower edge portion of the inner panel and the roof means.

7. An automobile body in accordance with claim 6 in which said inner pillar panel is formed integrally with the longitudinal reinforcement means.

* * * * *